United States Patent
Hassler et al.

(10) Patent No.: US 10,775,298 B1
(45) Date of Patent: Sep. 15, 2020

(54) ELLIPSOMETER OR POLARIMETER SYSTEM HAVING AT LEAST ONE ROTATING ELEMENT WHICH IS DRIVEN BY A MOTOR COMPRISING AIR BEARING

(71) Applicants: Christopher D. Hassler, Crete, NE (US); Galen L. Pfeiffer, Roca, NE (US); Jeffrey S. Hale, Lincoln, NE (US); Craig M. Herzinger, Lincoln, NE (US); Brian D. Guenther, Lincoln, NE (US); Brooks A. Hitt, Lincoln, NE (US)

(72) Inventors: Christopher D. Hassler, Crete, NE (US); Galen L. Pfeiffer, Roca, NE (US); Jeffrey S. Hale, Lincoln, NE (US); Craig M. Herzinger, Lincoln, NE (US); Brian D. Guenther, Lincoln, NE (US); Brooks A. Hitt, Lincoln, NE (US)

(73) Assignee: J.A. WOOLLAM CO., INC., Lincoln, DE (US)

( * ) Notice: Subject to any disclaimer, the term of this patent is extended or adjusted under 35 U.S.C. 154(b) by 0 days.

(21) Appl. No.: 16/501,596

(22) Filed: May 6, 2019

Related U.S. Application Data

(60) Provisional application No. 62/762,674, filed on May 14, 2018.

(51) Int. Cl.
*G01N 21/21* (2006.01)
*F16C 32/06* (2006.01)

(52) U.S. Cl.
CPC ........ *G01N 21/211* (2013.01); *F16C 32/0614* (2013.01); *F16C 2370/20* (2013.01); *G01N 2201/0683* (2013.01)

(58) Field of Classification Search
CPC .................................................. G01N 21/211
USPC .......................................................... 356/368
See application file for complete search history.

(56) References Cited

U.S. PATENT DOCUMENTS

| | | | | |
|---|---|---|---|---|
| 4,672,196 A | * | 6/1987 | Canino | G01B 11/065 250/225 |
| 2005/0078893 A1 | * | 4/2005 | Furuta | B24B 5/22 384/100 |
| 2005/0288171 A1 | * | 12/2005 | Ujita | C04B 35/117 501/127 |
| 2011/0243762 A1 | * | 10/2011 | Daikoku | F04D 29/584 417/321 |
| 2013/0044318 A1 | * | 2/2013 | Cho | G01N 21/211 356/369 |

* cited by examiner

*Primary Examiner* — Tarifur R Chowdhury
*Assistant Examiner* — Omar H Nixon
(74) *Attorney, Agent, or Firm* — James D. Welch

(57) ABSTRACT

Ellipsometers and polarimeters and the like having at least one rotating element which is driven by a motor that comprises air bearings.

11 Claims, 2 Drawing Sheets ns
ELLIPSOMETER OR POLARIMETER SYSTEM HAVING AT LEAST ONE ROTATING ELEMENT WHICH IS DRIVEN BY A MOTOR COMPRISING AIR BEARING

This Application Claims Benefit of Provisional Application No. 62/762,674 Filed May 14, 2018.

TECHNICAL FIELD

The present invention relates to ellipsometers and polarimeters and the like comprising at least one rotating element, and more particularly to ellipsometers and polarimeters in which the at least one rotating element is driven by a motor that comprises air bearings.

BACKGROUND

It is known to apply ellipsometers and polarimeters in the investigation of samples. Ellipsometers and polarimeters comprise a source of electromagnetic radiation, a polarizer, a stage for supporting a sample, an analyzer and a detector. There can also be present a compensator at some point between the polarizer and analyzer. Typically at least one of a present polarizer, analyzer and/or compensator is caused to rotate during collection of sample characterizing data during use.

It is also known to apply air bearings in motors that cause rotary motion, instead of more standard ball bearings and the like. Air bearings use a thin film or pressurized gas to provide a low friction load-bearing interface between surfaces which do not touch in use. The use of air bearings are less prone to problems of friction wear, particulates and lubricant handling etc., and offer advantages in precision positioning, especially in high speed applications. It is noted that the terminology "air" is to be read broadly to include dried atmospheric air, nitrogen, argon or any other gas of combination of gasses for the purposes herein.

For insight, it is noted that a distinction is made between what are termed "aerodynamic bearings", which establish an air cushion through relative motion between a stator and moving parts, and "aerostatic bearings" in which a pressurized gas is continually entered during use, from an external source. It is the later aerostatic type of air bearing that is applied in the present invention.

While there is no known published literature or Patents pending or issued, it is rumored that KLA-Tencor has adapted motors for use in ellipsometers to use air bearings. There is one known expired U.S. Pat. No. 4,434,025 to Robillard, which mentions in passing, in Col. 9, Line 34 the terminology "air bearing", and suggests use thereof in the monochromatic system therein, however, no description of a motor system comprising an air bearing is provided. If there are additional references pertaining to the use of air bearings in ellipsometers and polarimeters and the like, they are not known to the Inventors herein at this time.

It is noted that off the shelf "air bearing" containing motors are available from many manufacturers, however, the Inventors herein have found all standard motors containing air bearings to be unacceptable for application in ellipsometer and polarimeter and the like systems. The reason for this is that available air bearing containing motors, which have a centrally located hollow shaft through which in use a beam of electromagnetic radiation passes when applied in ellipsometry, and which can be fashioned to comprise a polarizer, analyzer or compensator in the path of said electromagnetic beam—make no provision for preventing a gas entered thereinto, which forms the air bearings, from exiting through the beam path. While for many applications this is a not a problem, in ellipsometry and polarimetry a changing environment in the path of a beam of electromagnetic radiation causes unpredictable and unacceptable changes in collected data. While application of air bearings in a motor system applied to cause a polarizer, analyzer and/or compensator to rotate in use is beneficial for many reasons, (not the least of which is that rotation speed is far more constant over time than when other type bearings are utilized), use of air bearings that allow gas entered thereinto to exit through a hollow shaft which provides access to said polarizer, analyzer and/or compensator, through which hollow shaft a beam of electromagnetic radiation is caused to pass in use, is unacceptable. As alluded to, the reason for this is that a change in the environment through which a beam of electromagnetic radiation passes adversely affects the ability to obtain data pertaining to a sample being investigated in that said data cannot be compensated for such random changes.

A need remains for ellipsometer and polarimeter and the like systems which comprise air bearings in a motor system therein which are applied to effect rotation of at least one selection from the group of:
  polarizer;
  analyzer; and
  compensator;
in use, which motor system provides a centrally located rotating hollow shaft through which a beam of electromagnetic radiation is caused to pass in use, which motor system is designed and applied such that gas entered thereinto to form the air bearings thereof does not exit through the hollow shaft during use.

DISCLOSURE OF THE INVENTION

The present invention is, in one aspect thereof, an ellipsometer or polarimeter comprising:
  a source of a beam of electromagnetic radiation;
  a polarizer;
  a stage for supporting a sample;
  an analyzer; and
  a detector.

Said ellipsometer or polarimeter further comprises at least one motor comprising a centrally located hollow shaft, which hollow shaft, during use, said motor causes to rotate, said hollow shaft comprising provision for containing said polarizer or said analyzer, and through which centrally located hollow shaft a beam of electromagnetic radiation provided by said source thereof, is caused to pass during use.

Importantly, said at least one motor comprises at least one air bearing and provision for entering a gas thereinto during use, said entered gas serving to prevent surfaces of rotating and non-rotating motor elements from contacting one another during use.

In use said source of a beam of electromagnetic radiation causes a beam of electromagnetic radiation to pass through said polarizer, interact with a sample placed one said stage for supporting a sample, pass through said analyzer and enter said detector, one of said polarizer and said analyzer being caused to rotate during use.

Said at least one motor is characterized in that air bearing forming gas entered thereinto during use exits by one or more pathways, all of which substantially exclude its passing through said hollow shaft.

Said ellipsometer or polarimeter can comprise two motors which are characterized in that air bearing forming gas entered thereinto during use exits by at least one pathway which excludes its passing through said hollow shaft. In this case one said motor comprises provision for containing said polarizer and the other comprises provision for containing said analyzer and both the polarizer and analyzer are caused to rotate during use.

A modified present invention ellipsometer or polarimeter comprises:
- a source of a beam of electromagnetic radiation;
- a polarizer;
- a stage for supporting a sample;
- an analyzer;
- a detector; and
- at least one compensator between said polarizer and said analyzer.

Said ellipsometer or polarimeter further comprises at least one motor comprising a centrally located hollow shaft, which hollow shaft, during use, said motor causes to rotate. Said hollow shaft comprises provision for containing said polarizer or said analyzer or at least one compensator, and through which centrally located hollow shaft a beam of electromagnetic radiation provided by said source thereof is caused to pass during use.

Said at least one motor comprises at least one air bearing and provision for entering a gas thereinto during use, said entered gas serving to prevent surfaces of rotating and non-rotating motor elements from contacting one another during use;

In use said source of a beam of electromagnetic radiation, causes a beam of electromagnetic radiation to pass through said polarizer, interact with a sample placed one said stage for supporting a sample, pass through said analyzer and enter said detector, said beam of electromagnetic radiation being also caused to pass through said at least one compensator, one of said polarizer, analyzer and at least one compensator being caused to rotate during use.

Said at least one motor being characterized in that air bearing forming gas entered thereinto during use exits by one or more pathways, all of which substantially exclude its passing through said hollow shaft.

Said modified present invention ellipsometer or polarimeter can further comprise a second compensator between said polarizer and said analyzer, in which case a hollow shaft in a second motor comprises provision for containing said second compensator and in which said second compensator is caused to rotate during use. Through which said second compensator said beam of electromagnetic radiation also caused to pass.

In any of said present invention ellipsometer or polarimeter, the source of a beam of electromagnetic radiation can provide a spectroscopic beam.

In any of said present invention An ellipsometer or polarimeter, the gas entered into said provision for entering a gas into said at least one motor air bearing can be selected from the group consisting of:
- compressed dry air;
- nitrogen; and
- argon.

In any of said present invention ellipsometer or polarimeter embodiments the at least one present motor can be a stepper motor.

In any of said present invention ellipsometer or polarimeter embodiments the at least one present motor can be a servo motor.

Methods of the present invention comprise providing an ellipsometer or polarimeter or the like system, followed by:

b) while causing said source of a beam of electromagnetic radiation to provide a beam of electromagnetic radiation that passes through said polarizer, interact with a sample placed one said stage for supporting a sample, pass through said analyzer and enter said detector, causing at least one of said polarizer and said analyzer, (and if present, said at least one compensator), which is present inside the associated hollow shaft, to rotate;

c) simultaneous with step b) causing said at least one motor which is characterized in that air bearing forming gas entered thereinto during use to exit by one or more pathways, all of which substantially exclude its passing through said hollow shaft.

The present invention will be better understood by reference to the Detailed Description Section of this Specification, with reference to the Drawings.

DETAILED DESCRIPTION

Figure 1:
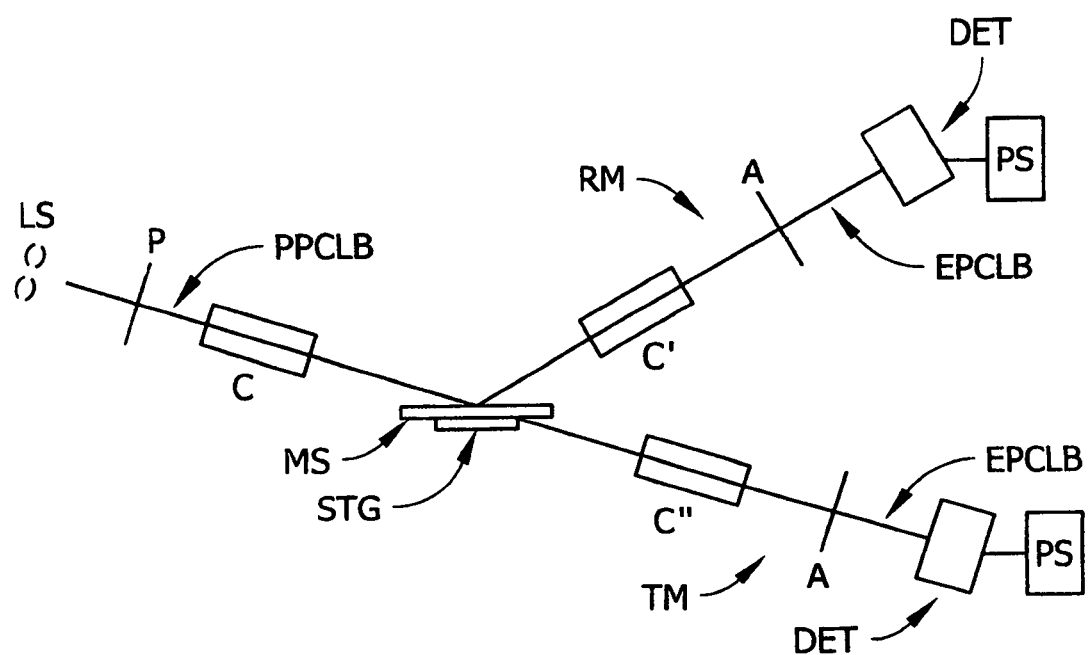
FIG. 1 shows an ellipsometer system demonstrating both reflective and transmissive capability.

FIG. 1 shows an Ellipsometer System demonstrating both reflective and transmissive capability. Shown are a Source (LS) of a beam of electromagnetic radiation, a Polarizer (P), a beam of electromagnetic radiation with a polarization state (PPCLB) imposed thereupon, a Stage for supporting a Sample (STG), with a Sample (MS) atop thereof. After the Stage (STG) there is shown Reflective (RM) Mode and Transmissive Mode (TM) pathways through an Analyzer and into a Detector (DET) into which a polarized electromagnetic beam (EPCLB) enters. Also note the presence of at least one Compensator (C) (C') (C"). While not required they can be included to provide added capability, the specifics of which are not important to the present invention.

The present invention provides that at least one selection from the group consisting of:
- Polarizer;
- Analyzer; and
- one or more Compensator;

can be present in an Air Bearing containing Hollow Shaft of a Motor (M), through which the Electromagnetic Beam (LB) present at it's location passes, while it is caused to rotate, in use.

Figure 2A:
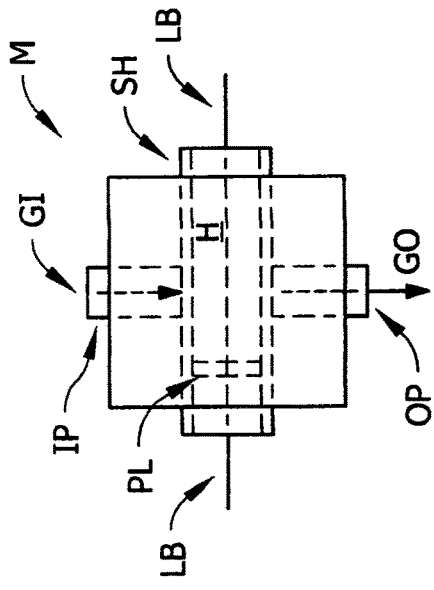
FIG. 2A shows a representative conceptual configuration of a prior art Air Bearing containing hollow shaft driven motor.

FIG. 2A shows a representative conceptual configuration of a prior art Air Bearing (AB) Hollow Shaft (SH) which is Motor driven to rotate in use. In particular it is to be appreciated that there is effectively no attention demonstrated to preventing Gas Flow along a path (GI)-(GO), from passing through the Hollow Shaft (SH) area through which an Electromagnetic Beam (LB) is caused to pass in use. Gas Flow In (GI) can possibly enter said inner Hollow (H) regions of the Hollow Shaft (SH) and exit as Gas Flow Out (GO). Additionally, the designed Gas Flow Out (GO) pathway can cause exiting Gas (GO) Flow to enturbulate the Atmosphere through which the Electromagnetic Beam, (LB) travels even outside the Air Bearing (AB). In Ellipsometer settings, in which a Payload (PL), (eg. at least one selection for the group consisting of Polarizer, Analyzer, Compensator), is present and caused to rotate in use, an uneven flow of Gas (GI)-(GO) through which the Electromagnetic Beam (LB) passes can enter unpredictable artifacts into data accumulated by a Detector (DET), (see FIG. 1).

Figure 2B:
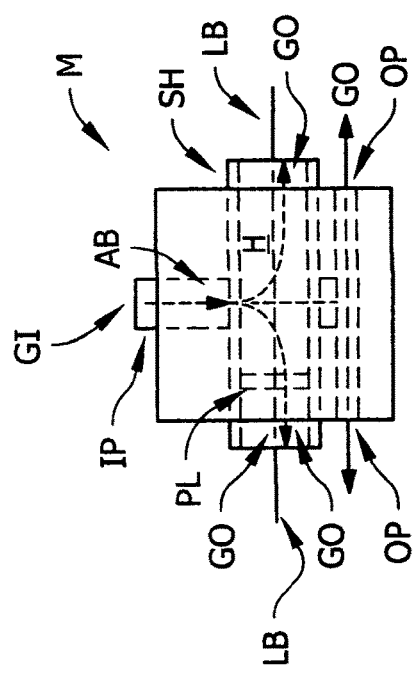
FIG. 2B shows a present invention configuration of an Air Bearing hollow shaft driven motor.
Figure 2C:
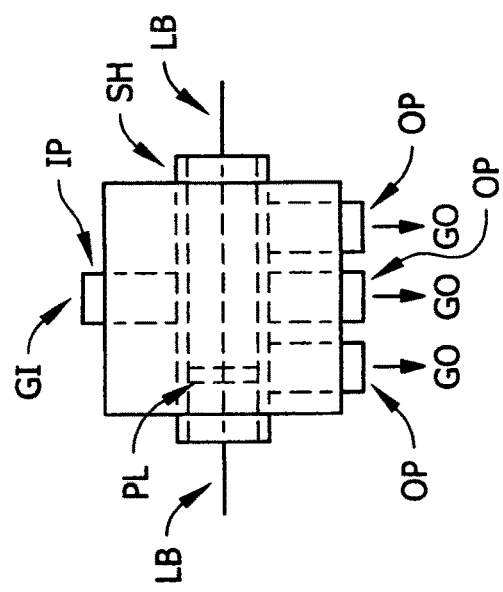
FIG. 2C shows a modified present invention configuration of an Air Bearing containing hollow shaft driven motor.

FIG. 2B shows a representative conceptual present invention configuration of an Air Bearing (AB) Hollow Shaft (H) driven Motor (H), wherein great attention is paid to preventing unpredictable, changing Gas Flows (GI)-(GO) in a region through which the Electromagnetic Beam (LB) is caused to pass. Note that in FIG. 2B, all Gas Flows (GI)-(GO) are well away from the regions in which the Electromagnetic Beam (LB) propagates. Further, while only one Gas Flow Pathway (GI)-(GO) is shown in FIG. 2B, the present invention includes the case where multiple pathways are present. That is, while only One Gas exiting Port is shown in FIG. 2B, said Output Port (OP) can be distributed into a plurality of Output Ports (OP), as shown in FIG. 2C. While not shown, it is also within the scope of the present invention to provide a similar distributed arrangement at Input Port (GI).

FIGS. 2A vs. 2B and 2C focus on the major point of present invention, with FIG. 2C showing a variation on the theme. That is, FIG. 2B shows a present invention configuration of an Air Bearing (AB) containing Hollow Shaft (SH) driven Motor (M) configuration in which substantially all pathways that could cause Atmospheric Turbulence in a region through which an Electromagnetic Beam (LB) passes in use, (as exist in FIG. 2A), are blocked. All Gas Flow(s) (GI)-(GO) are entered and exited well away from any region through which the Electromagnetic beam (LB) passes in present invention configurations.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. An ellipsometer or polarimeter comprising:
   a source of a beam of electromagnetic radiation;
   a polarizer;
   a stage for supporting a sample;
   an analyzer; and
   a detector;
   said ellipsometer or polarimeter further comprising at least one motor comprising a centrally located hollow shaft, which hollow shaft, during use, said motor causes to rotate, said hollow shaft comprising provision for containing said polarizer or said analyzer, and through which centrally located hollow shaft a beam of electromagnetic radiation is caused to pass during use;
   said at least one motor comprising at least one air bearing and provision for entering a gas thereinto during use, said entered gas serving to prevent surfaces of rotating and non-rotating motor elements from contacting one another during use;
   such that in use said source of a beam of electromagnetic radiation causes a beam of electromagnetic radiation to pass through said polarizer, interact with a sample placed one said stage for supporting a sample, pass through said analyzer and enter said detector, one of said polarizer and said analyzer being caused to rotate during use;
   said at least one motor being characterized in that air bearing forming gas entered thereinto during use exits by one or more pathways, all of which substantially exclude its passing through said hollow shaft;
   said ellipsometer or polarimeter being distinguished in that it comprises two motors which are characterized in that air bearing forming gas entered into each during use exits by at least one pathway which excludes its passing through said hollow shaft, one said motor comprising provision for containing said polarizer and the other comprising provision for containing said analyzer and in which both the polarizer and analyzer are caused to rotate during use.

2. An ellipsometer or polarimeter
   a source of a beam of electromagnetic radiation;
   a polarizer;
   a stage for supporting a sample;
   an analyzer;
   a detector; and
   at least one compensator between said polarizer and said analyzer;
   at least one compensator between said polarizer and said analyzer;
   said ellipsometer or polarimeter further comprising at least one motor comprising a centrally located hollow shaft, which hollow shaft, during use, said motor causes to rotate, said hollow shaft comprising provision for containing said polarizer or said analyzer or at least one compensator, and through which centrally located hollow shaft a beam of electromagnetic radiation is caused to pass during use;
   said at least one motor comprising at least one aerostatic rather than aerodynamic air bearing and provision for entering a gas thereinto during use, said entered gas serving to prevent surfaces of rotating and non-rotating motor elements from contacting one another during use;
   such that in use said source of a beam of electromagnetic radiation causes a beam of electromagnetic radiation to pass through said polarizer, interact with a sample placed one said stage for supporting a sample, pass through said analyzer and enter said detector, said beam of electromagnetic radiation being also caused to pass through said at least one compensator, one of said polarizer, analyzer and said at least one compensator being caused to rotate during use;
   said at least one motor being characterized in that air bearing forming gas entered thereinto during use exits by one or more pathways, all of which substantially exclude its passing through said hollow shaft.

3. An ellipsometer or polarimeter as in claim 2, which further comprises a second compensator between said polarizer and said analyzer, and in which a hollow shaft in a second motor which comprises at least one aerostatic rather than aerodynamic air bearing comprises provision for containing said second compensator and in which said second compensator is caused to rotate during use, and through which said second compensator said beam of electromagnetic radiation also caused to pass.

4. An ellipsometer or polarimeter as in claim 1 or 2 or 3 in which the source of a beam of electromagnetic radiation provides a spectroscopic beam.

5. An ellipsometer or polarimeter as in claim 1 or 2 or 3, in which the gas entered into said provision for entering a gas into said at least one motor air bearing is selected from the group consisting of:
   compressed dry air;
   nitrogen; and
   argon.

6. An ellipsometer or polarimeter as in claim 1 or 2 or 3, in which the at least one present motor is a stepper motor.

7. An ellipsometer or polarimeter as in claim 1 or 2 or 3, in which at least one present motor is a servo motor.

8. A method of practicing ellipsometry comprising the steps of;
  a) providing an ellipsometer or polarimeter comprising:
     a source of a beam of electromagnetic radiation;
     a polarizer;
     a stage for supporting a sample;
     an analyzer; and
     a detector;
  said ellipsometer or polarimeter further comprising at least one motor comprising a centrally located hollow shaft, which hollow shaft, during use, said motor causes to rotate, said hollow shaft comprising provision for containing said polarizer or said analyzer, and through which centrally located hollow shaft a beam of electromagnetic radiation is caused to pass during use;
  said at least one motor comprising at least one air bearing and provision for entering a gas thereinto during use, said entered gas serving to prevent surfaces of rotating and non-rotating motor elements from contacting one another during use;
  such that in use said source of a beam of electromagnetic radiation causes a beam of electromagnetic radiation to pass through said polarizer, interact with a sample placed one said stage for supporting a sample, pass through said analyzer and enter said detector, one of said polarizer and said analyzer being caused to rotate during use;
  said at least one motor being characterized in that air bearing forming gas entered thereinto during use exits by one or more pathways, all of which substantially exclude its passing through said hollow shaft;
  b) while causing said source of a beam of electromagnetic radiation to provide a beam of electromagnetic radiation that passes through said polarizer, interact with a sample placed one said stage for supporting a sample, pass through said analyzer and enter said detector, causing at least one of said polarizer and said analyzer which is present inside the associated hollow shaft, to rotate;
  c) simultaneous with step b) causing said at least one motor which is characterized in that air bearing forming gas entered thereinto during use to exit by one or more pathways, all of which substantially exclude its passing through said hollow shaft.

9. A method of practicing ellipsometry comprising the steps of:
  a) providing an ellipsometer or polarimeter comprising:
     a source of a beam of electromagnetic radiation;
     a polarizer;
     a stage for supporting a sample;
     an analyzer;
     a detector; and
     at least one compensator between said polarizer and said analyzer;
  said ellipsometer or polarimeter further comprising at least one motor comprising a centrally located hollow shaft, which hollow shaft, during use, said motor causes to rotate, said hollow shaft comprising provision for containing said polarizer or said analyzer or at least one compensator, and through which centrally located hollow shaft a beam of electromagnetic radiation is caused to pass during use;
  said at least one motor comprising at least one air bearing and provision for entering a gas thereinto during use, said entered gas serving to prevent surfaces of rotating and non-rotating motor elements from contacting one another during use;
  such that in use said source of a beam of electromagnetic radiation causes a beam of electromagnetic radiation to pass through said polarizer, interact with a sample placed one said stage for supporting a sample, pass through said analyzer and enter said detector, said beam of electromagnetic radiation being also caused to pass through said at least one compensator, one of said polarizer, analyzer and at least one compensator being caused to rotate during use;
  said at least one motor being characterized in that air bearing forming gas entered thereinto during use exits by one or more pathways, all of which substantially exclude its passing through said hollow shaft;
  b) while causing said source of a beam of electromagnetic radiation to provide a beam of electromagnetic radiation that passes through said polarizer, interact with a sample placed one said stage for supporting a sample, pass through said analyzer and enter said detector, causing at least one of said polarizer and said analyzer and said at least one compensator which is present inside the associated hollow shaft, to rotate;
  c) simultaneous with step b) causing said at least one motor which is characterized in that air bearing forming gas entered thereinto during use to exit by one or more pathways, all of which substantially exclude its passing through said hollow shaft.

10. An ellipsometer or polarimeter comprising selections from the group consisting of:
  a source of a beam of electromagnetic radiation;
  a polarizer;
  a stage for supporting a sample;
  an analyzer;
  a detector; and
  said ellipsometer or polarimeter further comprising at least one motor comprising a centrally located hollow shaft, which hollow shaft, during use, said motor causes to rotate, said hollow shaft comprising provision for containing said polarizer or said analyzer, and through which centrally located hollow shaft a beam of electromagnetic radiation is caused to pass during use;
  said at least one motor comprising at least one aerostatic rather than aerodynamic air bearing having provision for entering a gas thereinto during use, said entered gas serving to prevent surfaces of rotating and non-rotating motor elements from contacting one another during use;
  such that in use said source of a beam of electromagnetic radiation causes a beam of electromagnetic radiation to pass through said polarizer, interact with a sample placed one said stage for supporting a sample, pass through said analyzer and enter said detector, at least one of said polarizer and said analyzer being caused to rotate during use.

11. An ellipsometer or polarimeter comprising selections from the group consisting of:
  a source of a beam of electromagnetic radiation;
  a polarizer;
  a stage for supporting a sample;
  an analyzer;
  a detector; and
  at least one compensator between said polarizer and said analyzer;
  said ellipsometer or polarimeter further comprising at least one motor comprising a centrally located hollow shaft, which hollow shaft, during use, said motor causes to rotate, said hollow shaft comprising provision for containing said polarizer or said analyzer or said at least one compensator, and through which centrally located hollow shaft a beam of electromagnetic radiation is caused to pass during use;
  said at least one motor comprising at least one aerostatic rather than aerodynamic air bearing and having provision for entering a gas thereinto during use, said entered gas serving to prevent surfaces of rotating and non-rotating motor elements from contacting one another during use;

such that in use said source of a beam of electromagnetic radiation causes a beam of electromagnetic radiation to pass through said polarizer, interact with a sample placed one said stage for supporting a sample, pass through said analyzer and enter said detector, said at least one compensator being caused to rotate during use.

\* \* \* \* \*